United States Patent
Yamashita et al.

(10) Patent No.: US 10,521,743 B2
(45) Date of Patent: Dec. 31, 2019

(54) MANAGING METHOD AND MANAGING DEVICE OF AN ELECTRONIC COMPONENT MOUNTING SYSTEM HAVING A PLURALITY OF PRODUCTION LINES

(71) Applicant: FUJI CORPORATION, Chiryu (JP)

(72) Inventors: Yukihiro Yamashita, Toyohashi (JP); Yoshihiro Yasui, Nagoya (JP)

(73) Assignee: FUJI CORPORATION, Chiryu (JP)

( * ) Notice: Subject to any disclaimer, the term of this patent is extended or adjusted under 35 U.S.C. 154(b) by 473 days.

(21) Appl. No.: 14/909,514

(22) PCT Filed: Aug. 9, 2013

(86) PCT No.: PCT/JP2013/071708
§ 371 (c)(1),
(2) Date: Feb. 2, 2016

(87) PCT Pub. No.: WO2015/019500
PCT Pub. Date: Feb. 12, 2015

(65) Prior Publication Data
US 2016/0196520 A1    Jul. 7, 2016

(51) Int. Cl.
*G06Q 10/06*    (2012.01)
(52) U.S. Cl.
CPC .............................. *G06Q 10/06311* (2013.01)
(58) Field of Classification Search
None
See application file for complete search history.

(56) References Cited

U.S. PATENT DOCUMENTS 4,852,001 A * 7/1989 Tsushima ......... G05B 19/41865
                                                    700/100
4,958,292 A * 9/1990 Kaneko ............ G05B 19/41865
                                                    700/106
(Continued)

FOREIGN PATENT DOCUMENTS

EP    1282038 A2 *  2/2003  ............ G06F 9/4881
EP    1422987 A2 *  5/2004  ............. G06F 9/445
(Continued)

OTHER PUBLICATIONS

Brandimarte, Paolo. "Routing and scheduling in a flexible job shop by tabu search." Annals of Operations research 41.3 (1993): 157-183. (Year: 1993).*

(Continued)

*Primary Examiner* — Thomas L Mansfield
*Assistant Examiner* — Derick J Holzmacher
(74) *Attorney, Agent, or Firm* — Oblon, McClelland, Maier & Neustadt, L.L.P.

(57) ABSTRACT

A managing method of an electronic component mounting system having a plurality of production lines, the method including: preferentially allocating a job group having the latest scheduled finish time among a plurality of job groups, to one of the plurality of production lines. The allocating includes (1) specifying the scheduled finish time with respect to all of the combinations between unallocated job groups among the plurality of job groups and the plurality of production lines, (2) specifying the earliest scheduled finish time from the scheduled finish time specified for each production line, and the production line thereof, with respect to each of the unallocated job groups, and (3) allocating the job group related to the latest scheduled finish time among the earliest scheduled finish time specified for each unallocated job group, to the production line thereof.

6 Claims, 8 Drawing Sheets

(56) References Cited

U.S. PATENT DOCUMENTS

| | | | | |
|---|---|---|---|---|
| 5,150,288 A * | 9/1992 | Imai | G05B 19/4183 | 700/112 |
| 5,237,508 A * | 8/1993 | Furukawa | G05B 19/41865 | 700/100 |
| 5,321,619 A * | 6/1994 | Matsuda | B62D 65/005 | 235/375 |
| 5,442,561 A * | 8/1995 | Yoshizawa | G05B 19/41865 | 700/100 |
| 5,615,138 A * | 3/1997 | Tanaka | G06Q 10/06 | 700/108 |
| 5,696,689 A * | 12/1997 | Okumura | G05B 19/4189 | 198/347.1 |
| 5,737,228 A * | 4/1998 | Ishizuka | G05B 19/41865 | 700/102 |
| 5,826,236 A * | 10/1998 | Narimatsu | G06Q 10/06 | 705/7.24 |
| 5,946,212 A * | 8/1999 | Bermon | G06Q 10/06 | 29/832 |
| 5,971,584 A * | 10/1999 | Iriuchijima | G05B 19/41865 | 700/101 |
| 6,317,725 B1 * | 11/2001 | Muraoka | G06Q 10/06 | 705/28 |
| 6,356,797 B1 * | 3/2002 | Hsieh | G05B 19/41865 | 700/101 |
| 6,438,436 B1 * | 8/2002 | Hohkibara | G06Q 10/06 | 700/97 |
| 6,738,747 B1 * | 5/2004 | Tanaka | G05B 19/41865 | 700/121 |
| 6,795,742 B1 * | 9/2004 | Ichikawa | G06Q 10/06 | 700/97 |
| 6,801,820 B1 * | 10/2004 | Lilly | G06Q 10/06 | 700/100 |
| 6,898,472 B2 * | 5/2005 | Crampton | G06Q 10/06 | 700/97 |
| 7,286,889 B1 * | 10/2007 | Orzell | G06Q 10/06 | 700/101 |
| 7,668,614 B2 * | 2/2010 | Govind | G05B 19/41865 | 700/100 |
| 7,904,192 B2 * | 3/2011 | Chua | G06Q 10/06 | 700/100 |
| 7,957,822 B2 * | 6/2011 | Morita | H05K 13/0895 | 700/56 |
| 8,464,268 B2 * | 6/2013 | Zhou | G05B 19/41865 | 700/101 |
| 2002/0123818 A1 * | 9/2002 | Yamada | H01L 21/67276 | 700/121 |
| 2003/0204280 A1 * | 10/2003 | Kobayashi | G05B 19/41895 | 700/101 |
| 2005/0096770 A1 * | 5/2005 | Chua | G05B 19/41865 | 700/102 |
| 2005/0102052 A1 * | 5/2005 | Yoshida | H05K 13/08 | 700/117 |
| 2005/0154625 A1 * | 7/2005 | Chua | G06Q 10/06 | 700/100 |
| 2006/0015203 A1 * | 1/2006 | Fukushima | G06Q 10/06 | 700/100 |
| 2006/0200264 A1 * | 9/2006 | Kodama | G06Q 10/087 | 700/121 |
| 2006/0224263 A1 * | 10/2006 | Arai | G06Q 10/06 | 700/95 |
| 2006/0229758 A1 * | 10/2006 | Maenishi | G06F 17/50 | 700/121 |
| 2007/0288306 A1 * | 12/2007 | Ohishi | G06Q 10/06 | 700/113 |
| 2008/0066072 A1 * | 3/2008 | Yurekli | G06Q 10/06 | 718/104 |
| 2008/0275584 A1 * | 11/2008 | Izumi | G05B 19/41865 | 700/101 |
| 2010/0087941 A1 * | 4/2010 | Assaf | G06Q 10/06 | 700/101 |
| 2011/0066269 A1 * | 3/2011 | Zhou | G05B 19/41865 | 700/101 |
| 2011/0218754 A1 * | 9/2011 | Mori | G01B 11/00 | 702/108 |
| 2012/0099139 A1 * | 4/2012 | Zhou | G06F 3/1211 | 358/1.15 |
| 2012/0314248 A1 * | 12/2012 | Zhou | G06F 3/1212 | 358/1.15 |
| 2015/0206086 A1 * | 7/2015 | Kitayama | G05B 19/4188 | 705/7.26 |
| 2015/0220081 A1 * | 8/2015 | Morita | G05B 19/41865 | 700/99 |
| 2016/0116898 A1 * | 4/2016 | Iwata | G05B 19/41865 | 700/117 |
| 2019/0064784 A1 * | 2/2019 | Iwata | G05B 19/41865 | |

FOREIGN PATENT DOCUMENTS

| | | | | |
|---|---|---|---|---|
| EP | 2364072 A2 * | 9/2011 | | G01B 11/00 |
| EP | 3171238 A1 * | 5/2017 | | G05B 19/4188 |
| EP | 2899605 B1 * | 7/2017 | | G05B 19/41865 |
| JP | 5-138467 | 6/1993 | | |
| JP | 5-324664 A | 12/1993 | | |
| JP | 2001-337712 A | 12/2001 | | |
| JP | 2012-242950 A | 12/2012 | | |
| JP | 2013-8930 A | 1/2013 | | |

OTHER PUBLICATIONS

Hax, Arnoldo C., and Harlan C. Meal. "Hierarchical integration of production planning and scheduling." (1973). (Year: 1973).*

Zeballos, L. J. "A constraint programming approach to tool allocation and production scheduling in flexible manufacturing systems." Robotics and Computer-Integrated Manufacturing 26.6 (2010): 725-743. (Year: 2010).*

Neammanee, Patcharaporn, and Manop Reodecha. "A memetic algorithm-based heuristic for a scheduling problem in printed circuit board assembly." Computers & Industrial Engineering 56.1 (2009): 294-305 (Year: 2009).*

Askin, Ronald G., Moshe Dror, and Asoo J. Vakharia. "Printed circuit board family grouping and component allocation for a multimachine, open-shop assembly cell." Naval Research Logistics (NRL) 41.5 (1994): 587-608 (Year: 1994).*

Lee, Geun-Cheol, et al. "A dispatching rule-based approach to production scheduling in a printed circuit board manufacturing system." Journal of the Operational Research Society 54.10 (2003): 1038-1049. (Year: 2003).*

Hayrinen, Timo, et al. "Scheduling algorithms for computer-aided line balancing in printed circuit board assembly." Production Planning & Control 11.5 (2000): 497-510. (Year: 2000).*

Banerjee, Prashant, and Hussein A. Armouti. "JIT approach to integrating production order scheduling and production activity control." Computer Integrated Manufacturing Systems 5.4 (1992): 283-290. (Year: 1992).*

Piramuthu, Selwyn, Narayan Raman, and Michael J. Shaw. "Learning-based scheduling in a flexible manufacturing flow line." IEEE Transactions on Engineering Management 41.2 (1994): 172-182. (Year: 1994).*

Neammanee, Patcharaporn, and Manop Reodecha. "A memetic algorithm-based heuristic for a scheduling problem in printed circuit board assembly." Computers & Industrial Engineering 56.1 (2009): 294-305 (Year: 2009).*

Askin, Ronald G., Moshe Dror, and Asoo J. Vakharia. "Printed circuit board family grouping and component allocation for a multimachine, open-shop assembly cell." Naval Research Logistics (NRL) 41.5 (1994): 587-608 (Year: 1994).*

Lee, Geun-Cheol, et al. "A dispatching rule-based approach to production scheduling in a printed circuit board manufacturing system." Journal of the Operational Research Society 54.10 (2003): 1038-1049. (Year: 2003).*

Hayrinen, Timo, et al. "Scheduling algorithms for computer-aided line balancing in printed circuit board assembly." Production Planning & Control 11.5 (2000): 497-510. (Year: 2000).*

Banerjee, Prashant, and Hussein A. Armouti. "JIT approach to integrating production order scheduling and production activity control." Computer Integrated Manufacturing Systems 5.4 (1992): 283-290. (Year: 1992).*

(56) References Cited

OTHER PUBLICATIONS

Piramuthu, Selwyn, Narayan Raman, and Michael J. Shaw. "Learning-based scheduling in a flexible manufacturing flow line." IEEE Transactions on Engineering Management 41.2 (1994): 172-182. (Year: 1994).*
International Search Report dated Oct. 29, 2013 in PCT/JP13/71708 Filed Aug. 9, 2013.
Office Action dated Jan. 30, 2018 in Japanese Patent Application No. 2015-530652 (with English language translation) citing reference AO therein, 7 pages.
Extended European Search Report dated Mar. 31, 2016 in Patent Application No. 13891258.9.

\* cited by examiner

FIG. 4

|  | Production Line1 | Production Line2 | ....... | Production Line b |
|---|---|---|---|---|
| Job Group1 | T(1, 1) | T(1, 2) | ....... | T(1, b) |
| Job Group2 | T(2, 1) | T(2, 2) | ....... | T(2, b) |
| ⋮ | ⋮ |  |  | ⋮ |
| Job Group a | T(a, 1) | T(a, 2) | ....... | T(a, b) |

MANAGING METHOD AND MANAGING DEVICE OF AN ELECTRONIC COMPONENT MOUNTING SYSTEM HAVING A PLURALITY OF PRODUCTION LINES

TECHNICAL FIELD

The present description relates to a managing method and a managing device of an electronic component mounting system having a plurality of production lines.

BACKGROUND ART

An electronic component mounting system having a plurality of production lines is managed by a production order plan for allocating each job group of a plurality of job groups to a production line where the corresponding job group is performed.

PTL 1 discloses a managing method for giving top priority information to a specific job group based on experience and know-how of a person who creates a production order plan when allocating the job group having the same production due date to the production line. The managing method preferentially allocates a job group to which the top priority information is given, to the production line.

CITATION LIST

Patent Literature

PTL 1: JP-A-2001-337712

BRIEF SUMMARY

Problem to be Solved

Since the managing method of PTL 1 preferentially allocates the job group to which the top priority information is given, the production order of a job group to which the top priority information is not given becomes late. For this reason, there is a case where, a job group which requires a long period of time for mounting work among the job groups in which the production order is late remains. In this case, it is difficult to uniformize production finish time of the production line between a plurality of production lines. Non-uniform production finish time between the plurality of production lines deteriorates production efficiency of an electronic component mounting system.

The present description is to provide a managing method and a managing device for uniformizing the production finish time between a plurality of production lines in an electronic component mounting system having the plurality of production lines.

Means for Solving the Problem

A managing method disclosed in the present description is employed in an electronic component mounting device having a plurality of production lines. The managing method disclosed in the present description includes preferentially allocating a job group having the latest scheduled finish time among a plurality of job groups, to one of the plurality of production lines. When the job group which has a late scheduled finish time, that is, which requires a long period of time for the mounting work, is preferentially allocated to the production line, as the allocating work proceeds, the job group which requires a short period of time for the mounting work remains. By using the job group which requires a short period of time for the mounting work, it is possible to finely adjust the production finish time of the production line. For this reason, the managing method disclosed in the present description can uniformize the production finish time between the plurality of production lines.

A managing device disclosed in the present description is employed in an electronic component mounting system having a plurality of production lines. The managing device disclosed in the present description includes an allocating device which preferentially allocates a job group having the latest scheduled finish time among the plurality of job groups, to one of the plurality of production lines. When the allocating device preferentially allocates a job group which has a late scheduled finish time, that is, which requires a long period of time for the mounting work, to the production line, as the allocating work proceeds, the job group which requires a short period of time for the mounting work remains. The allocating device can finely adjust the production finish time of the production line by using the job group which requires a short period of time for the mounting work. For this reason, the managing device disclosed in the present description can uniformize the production finish time between the plurality of production lines.

BRIEF DESCRIPTION OF DRAWINGS

FIG. 4 illustrates a table showing scheduled finish time data created by the first allocating method.

DESCRIPTION OF EMBODIMENTS

Figure 1:
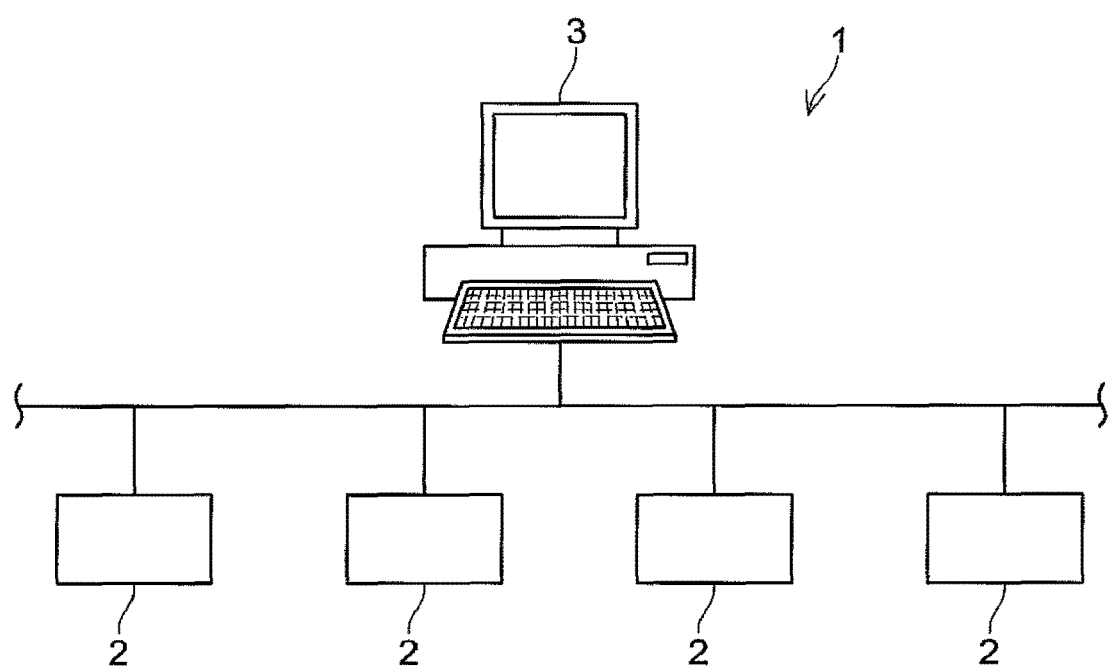
FIG. 1 illustrates a configuration of an electronic component mounting system.

An electronic component mounting system disclosed in the present description includes a plurality of production lines. Here, each of the production lines is configured to transport a printed board, and to mount a plurality of electronic components on the printed board. In general, each of the production lines may be provided with maunting-related machines, such as a solder printing machine, a plurality of electronic component mounting machines, a board appearance inspection machine, and a reflow furnace. The type, the number, and the disposition order of the mounting-related machines which configure the production line, may be the same between the plurality of production lines, and may be different from each other. The type, the number, and the disposition order of the mounting-related machines which configure the production line, are important in processing performance of work of mounting the plurality of electronic components on the printed board by the production line. For this reason, when the type, the number, and the disposition order of the mounting-related machines which configure the production line are different between the plurality of production lines, the time required for the mounting work of a job group varies depending on the processing performance of each production line. Here a job is a command including a production condition regarding a production item and a production number, and may include another production condition for example, production due date) as necessary. In addition, a job group is referred to as a set of jobs including at least one job. For example, in a case where the type of the electronic components mounted on each of the printed board which corresponds to the production item designated as a job "A," and the printed board which corresponds to the production item designated as a job "B," is generally common, if the mounting work of the job "A" and the mounting work of the job "B" are executed together, it is possible to omit work (referred to as a preparatory work) of setting the necessary electronic components in the electronic component mounting machines. The job "A" and the job "B" may be configured of a job group.

The managing method disclosed, in the present description includes preferentially allocating a job group having the latest scheduled finish time among a plurality of job groups, to one of the plurality of production lines. Preferably, the managing method disclosed in the present description includes specifying the scheduled finish time of the job group for each job group by the top priority production line, and allocating the job group related to the latest scheduled finish time among the scheduled finish time specified for each job group, to the top priority production line. Here, the top priority production line may be a production line selected for each job group, and may be a selected production line, which is common to all of the job groups. For example, the top priority production line selected for each job group may be a production line having the scheduled finish time earlier than that of any of other production lines when the target job group is allocated to the production line. The selected top priority production line which is common to all of the job groups may be a production line having the scheduled start time earlier than that of any of other production lines. The top priority production line varies each time when one job group among the plurality of job groups is allocated. For this reason, the managing method can prevent the job group from being allocated only in one production line, and allocate the plurality of job groups with excellent balance between a plurality of production lines, by allocating the job group to the top priority production line.

In a first managing method disclosed in the present description, the allocating may include (1) specifying the scheduled finish time with respect to all of the combinations between unallocated job groups among the plurality of job groups and the plurality of production lines, (2) specifying the earliest scheduled finish time from the scheduled finish time specified for each production line, and the production line thereof, with respect to each of the unallocated job groups, and (3) allocating the job group related to the latest scheduled finish time among the earliest scheduled finish time specified for each unallocated job group, to the production line. The first managing method can specify the top priority production line for each job group by performing steps (1) and (2). Furthermore, the first managing method can preferentially allocate the job group which requires a long period of time for the mounting work to the top priority production line by performing the step (3). As a result, as the allocating work proceeds, the job group which requires a short period of time for the mounting work remains. By using the job group which requires a short period of time for the mounting work, it is possible to finely adjust the production finish time of the production line. For this reason, the first managing method can uniformize the production finish time between the plurality of production lines. In the first managing method, the steps (1) to (3) may be repeated until all of the plurality of job groups are allocated.

In the step (1) of the first managing method, only the scheduled finish time regarding the production line which is previously allocated in the step (3) may be updated. Since a computation amount for calculating the scheduled finish time is suppressed, the processing of the managing method is simplified.

In a second managing method disclosed in the present description, the allocating may include (1) specifying the production line having the earliest scheduled start time among the plurality of production lines, (2) specifying the scheduled finish time by the production line having the earliest scheduled start time, with respect to each of unallocated job groups among the plurality of job groups, and (3) allocating the job group related to the latest scheduled finish time among the scheduled finish time specified for each unallocated job group, to the production line. The second managing method can specify the top priority production line which is common to all of the job groups by performing the step (1). Furthermore, the second managing method can preferentially allocate the job group which requires a long period of time for the mounting work to the top priority production line by performing the steps (2) and (3). As a result, as the allocating work proceeds, the job) group which requires a short period of time for the mounting work remains. By using the job group which requires a short period of time for the mounting work, it is possible to finely adjust the production finish time of the production line. For this reason, the second managing method can uniformize the production finish time between the plurality of production lines in the second managing method, the steps (1) to (3) may be repeated until all of the plurality of job groups are allocated.

The managing device disclosed in the present description includes an allocating device which preferentially allocates a job group having the latest scheduled finish time among the plurality of job groups, to one of the plurality of production lines. Preferably, the allocating device of the managing device disclosed in the present description specifies the scheduled finish time of the job group for each job group by the top priority production line, and allocates the job group related to the latest scheduled finish time among the scheduled finish time specified for each job group, to the top priority production line.

In a first managing device, disclosed in the present description, the allocating device may include a first specification processing portion, a second specification processing portion, and a first allocation processing portion. The first specification processing portion specifies a scheduled finish time with respect to all of the combinations between unallocated job groups among the plurality of job groups and the plurality of production lines. The second specification processing portion specifies the earliest scheduled finish time from the scheduled finish time specified for each production line, and the production line thereof, with respect to each of the unallocated job groups. The first allocation processing portion allocates the job group related, to the latest scheduled finish time among the earliest scheduled finish time specified for each unallocated job group, to the production line. Since the first managing device includes the first specification processing portion and the second specification processing portion, it is possible to specify the top priority production line for each job group. Furthermore, since, the first managing device includes the first allocation processing portion, it is possible to preferentially allocate the job group which requires a long period of time for the mounting work to the top priority production line. As a result, as the allocating work proceeds, the job group which requires a short period of time for the mounting work remains. By using the job group which requires a short period of time for the mounting work, it is possible to finely adjust the production finish time of the production line. For this reason, the first managing device, can uniformize the production finish time between the plurality of production lines.

In the first managing device, the allocating device may include a storage device which stores the scheduled finish time with respect to the all the combinations between the unallocated job groups among the plurality of job groups and the plurality of production lines.

In the first managing device, the first specification processing portion may update only the scheduled finish time with respect to the production line which is previously allocated by the first allocation processing portion. Since the computation amount for calculating the scheduled finish time is suppressed, the processing speed of the managing device becomes higher.

In a second managing device disclosed in the present description, the allocating device may include a third specification processing portion, a fourth specification processing portion, and a second allocation processing portion. The third specification processing portion specifies the production line having the earliest scheduled start time among the plurality of production lines. The fourth specification processing portion specifies the scheduled finish time by the production line having the earliest scheduled start time with respect to each of the unallocated job groups among the plurality of job groups. The second allocation processing portion allocates a job group related to the latest scheduled finish time among the scheduled finish time specified ed for each unallocated job group, to the production line. Since the second managing device includes the third specification processing portion, it is possible to specify the top priority production line which is common to all of the job groups. Furthermore, since the second managing device includes the fourth specification processing portion and the second allocation processing portion, it is possible to preferentially allocate, the job group which requires a long period of time for the mounting work to the top priority production line. As a result, as the allocating work proceeds, the job group which requires a short period of time for the mounting work remains. By using the job group which requires a short period of time for the mounting work, it is possible to finely adjust the production finish time of the production line. For this reason, the second managing device can uniformize the production finish time between the plurality of production lines.

Example

As illustrated in FIG. 1, an electronic component mounting system 1 includes a plurality of production lines 2 and a host computer 3 which can communicate with the plurality of production lines 2. The electronic component mounting system 1 executes job groups by using the plurality of production lines 2 while observing the production due date.

Each of the production lines 2 is provided with a plurality of mounting-related machines which are disposed along a transporting path of a printed board. The plurality of mounting related machines include a solder printing machine, a plurality of electronic component mounting machines, a board appearance inspection machine, and a reflow furnace. The production line 2 transports the printed board along the transporting path, and mounts a plurality of electronic components on the printed board by using the mounting-related machines.

Figure 2:
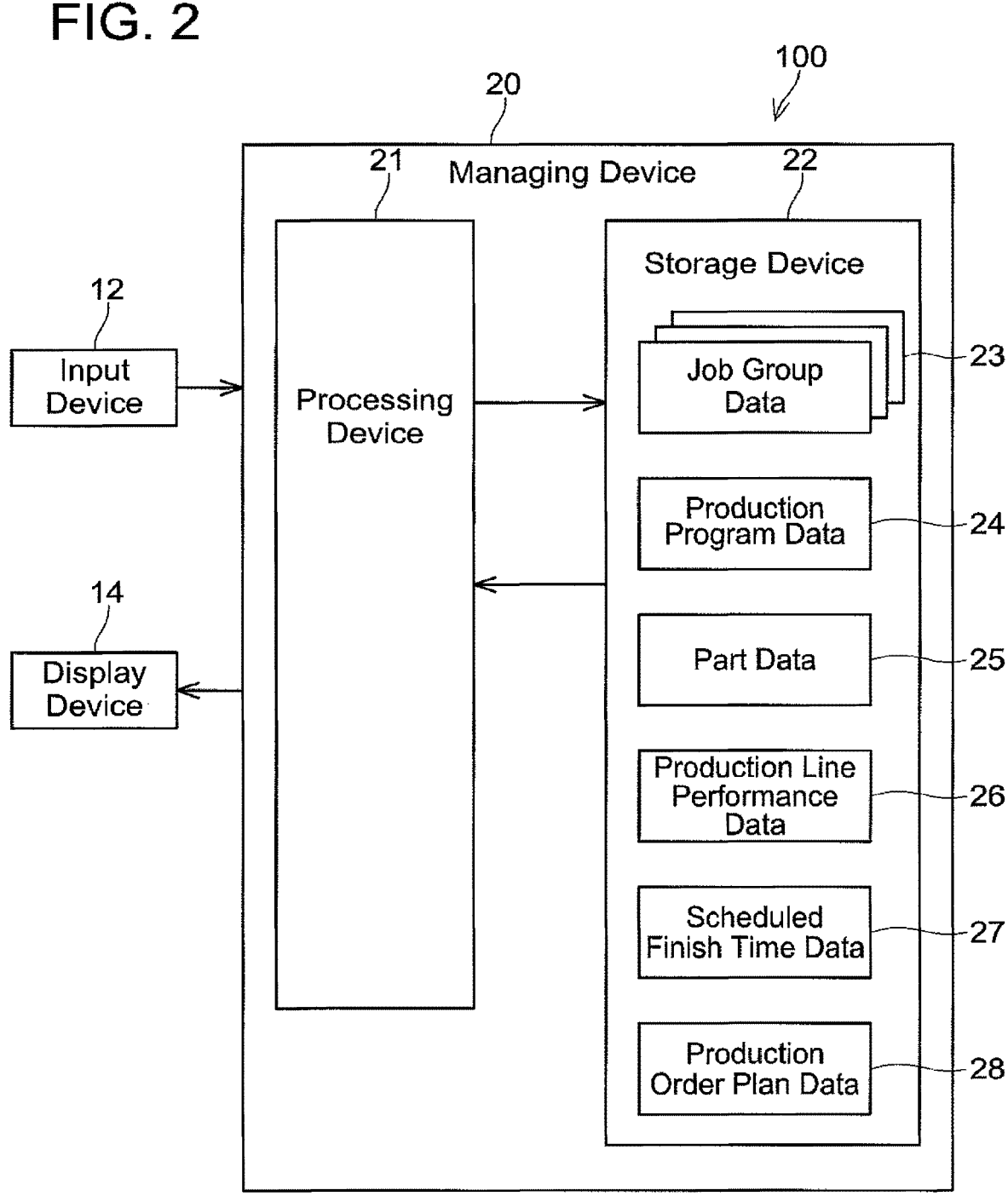
FIG. 2 illustrates a configuration of a managing device provided in a host computer.

The host computer 3 integrally controls the plurality of production lines 2. One function of the host computer 3 is performing the work of allocating the job group to any of the production lines 2. The allocating work is performed by an allocating device provided in the host computer 3. As illustrated in FIG. 2, an allocating device 100 included in the host computer 3 is provided with an input device 12, a display device 14, and a managing device 20.

The input device 12 is a user interface, and for example, includes a mouse and a keyboard. The display device 14 includes a display, and displays a production order plan shown by production order plan data which will be described later on the display. An operator can correct the production order plan displayed on the display of the display device 14 via the input device 12 as necessary.

The managing device 20 includes a processing device 21 and a storage device 22. The processing device 21 includes a central processing unit, and performs arithmetic processing with respect a plurality of types of data stored in the storage device 22 along a predetermined program. The processing device 21 includes a specification processing portion and an allocation processing portion described within a range of the patent claims.

The storage device 22 of the managing device 20 is configured to be capable of storing job group data 23, production program data 24, part data 25, production line performance data 26, scheduled finish time data 27, and production order plan data 28.

The job group data 23 is data including information according to the production due date, the production item, and the production number. When the operator inputs the information of the plurality of job groups which are scheduled to be produced to the managing device 20 via the input device 12, the job group data 23 is stored in the storage device 22.

The production program data 24 is data including the information according to the type and the number of the plurality of electronic components to be mounted on the printed board, and the position on the printed board on which each of the plurality of electronic components are mounted, and the information is specified for each production item.

The part data 25 is data including the information according to an operation condition when the electronic component mounting machines mount the electronic component, and the information is specified for each type of the electronic components.

The production line performance data 26 is data including the information according to the type, the number, and the disposition order of the mounting-related machines disposed in the production line, and the information is specified for each production line.

The scheduled finish time data 27 is data including the information according to scheduled time at which the mounting work of the job group is finished when it is assumed that the job group is allocated to the production line, and as will be described later, is data which is temporarily computed when creating the production order plan data 28.

The production order plan data 28 is data including the information regarding the production line and the order in which the job group is performed. The production order plan data 28 is data created by the managing device 20. The managing device 20 creates (or updates) the production order plan data 28 by performing a first allocating method and a second allocating method which will be described later.

Hereinafter, an allocating method which is performed by the managing device 20 when allocating the plurality of job groups having the same production due date to the production line, will be described. The managing device 20 of the example can selectively perform any one of the following first allocating method and the second allocating method, based on an instruction of the operator. In addition, as another embodiment, the managing device 20 may be capable of performing only one of the first allocating method and the second allocating method.

(First. Allocating Method)

Figure 3:
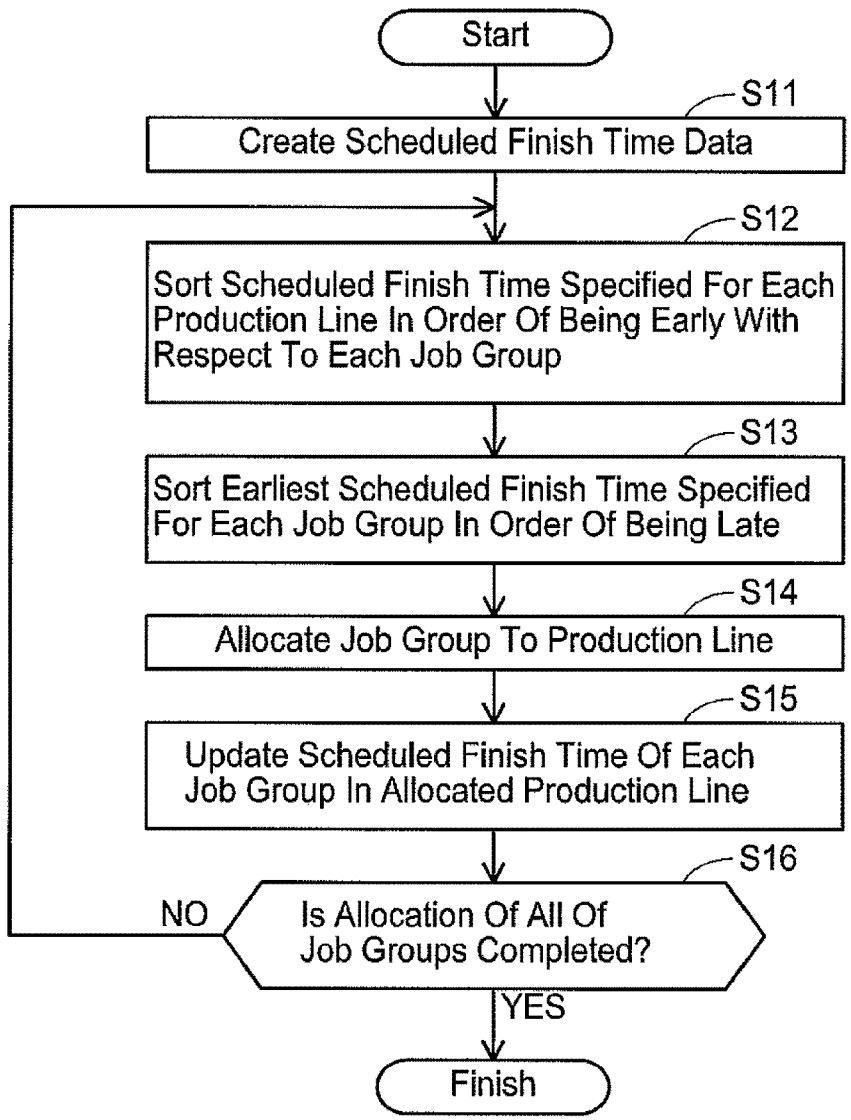
FIG. 3 illustrates a flowchart according to a first allocating method for creating production order plan data.

First, the first allocating method will be described. As illustrated in FIG. 3, in step S11, the processing device 21 of the managing device 20 creates the scheduled finish time data 27 based on the job group data 23, the production program data 24, the part data 25, and the production line performance, data 26. In FIG. 4, a table which shows the scheduled finish time data 27 is illustrated as an example. The scheduled finish time data 27 created by the first allocating method is data which describes the scheduled time at which the mounting work of the job group is finished with respect to the all of the combinations between the job groups and the production lines, when it is assumed that the job group is allocated to the production line. For example, when it is assumed that a job group 1 is allocated to a production line 1, the scheduled finish time is computed as follows. First, the processing device 21 computes the work time (referred to as a cycle time) which is required when the mounting work designated by the job group 1 is executed by the production line 1, based on the job group data 23, the production program data 24, the part data 25, and the production line performance data 26. Next, the processing device 21 adds the computed work time to the scheduled start time at which the production line 1 can start the production, and computes a scheduled finish time T (1, 1). The processing device 21 creates the scheduled finish time data 27 by performing the computation regarding the all of the combinations between the job groups and the production lines.

Next, in step S12, the processing device 21 sorts each of the job groups in an order of early scheduled finish time specified for each production line. Based on the result of sorting in order, the processing device 21 specifies the earliest scheduled finish time and the production line thereof with respect to each of the job groups. Accordingly, the processing device 21 can specify the top priority production line for each job group.

Next, in step S13, the processing device 21 sorts the earliest scheduled finish time specified for each job group in order of being late. Based on the result of sorting in order, the processing device 21 specifies the job group related to the latest scheduled finish time among the earliest scheduled finish time specified for each job group and the production line thereof.

Next, in step S14, the processing device 21 allocates the job group specified in step S13 and the production line thereof, and describes the job group and the production line in the production order plan data 28. Accordingly, the processing device 21 can preferentially allocate the job group having a long work time to the top priority production line.

Figure 5:
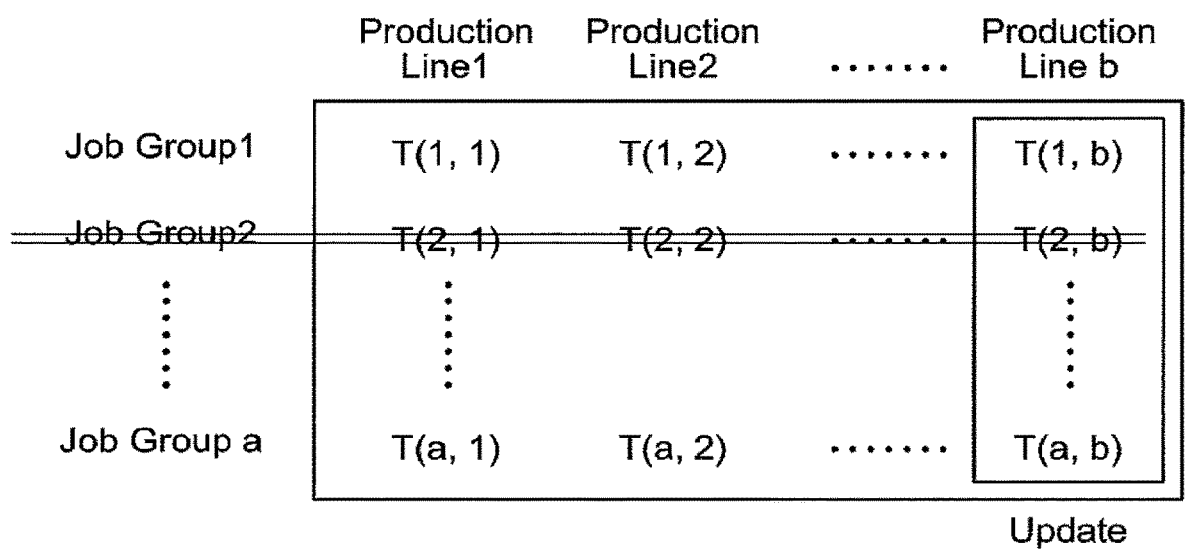
FIG. 5 illustrates an aspect in which the table of the scheduled finish time data is updated.

Next, in step S15, the processing device 21 re-computes the scheduled finish time for each job group in the production line allocated in step S14, and updates the scheduled finish time. For example, as illustrated in FIG. 5, a job group 2 is allocated to a production line b in step S14. In this case, the processing device 21 removes data regarding the job group 2 from the table of the scheduled finish time data 27, re-computes the scheduled finish time of the job group other than the job group 2 in the production line b, and updates the computed scheduled finish time. In this manner, by re-computing only the scheduled finish time with respect to the allocated production line, the processing speed of the allocating work is improved.

Next, in step S16, the processing device 21 determines whether or not the allocation of all of the job groups is completed. When the allocation of all of the job groups is completed, the allocating work is finished. When the allocation of all of the job groups is not completed, the process returns to step S12.

Figure 6:
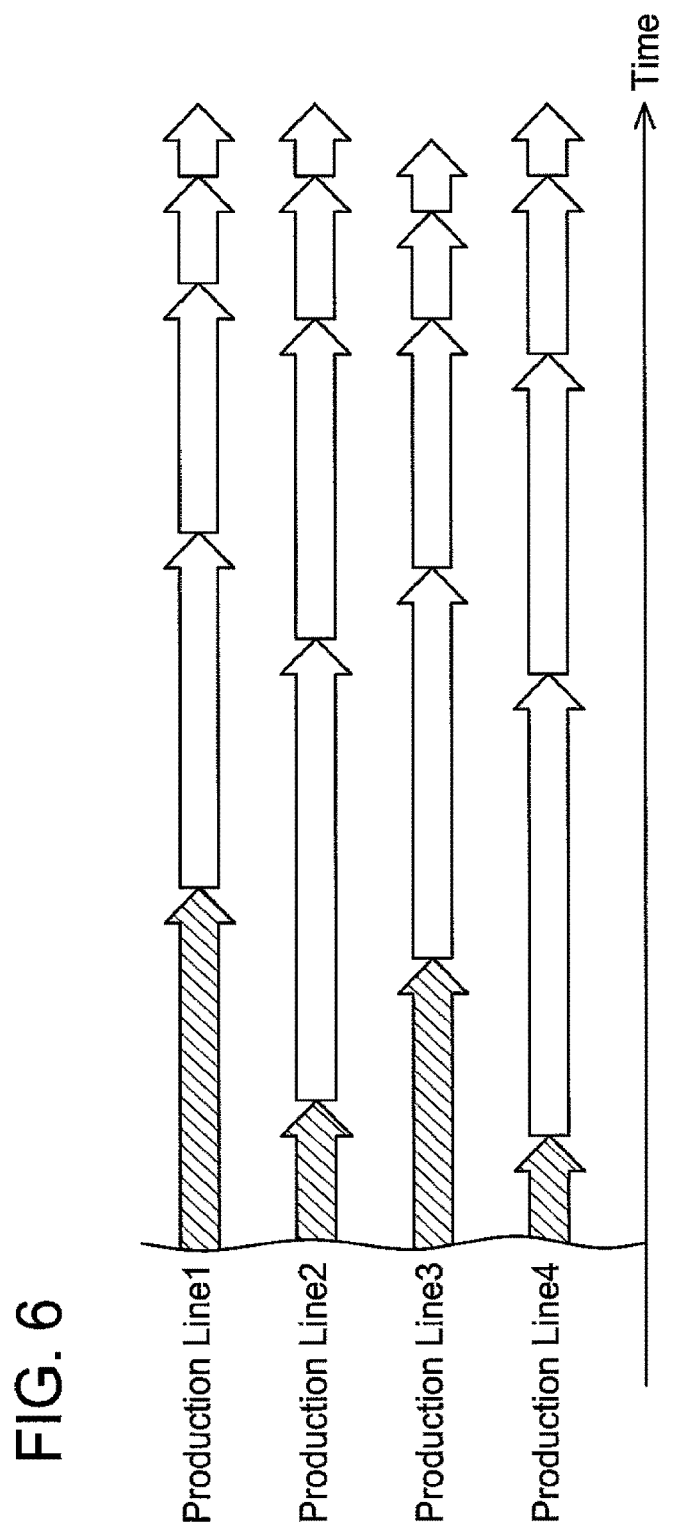
FIG. 6 schematically illustrates an aspect of a production order of a plurality of job groups allocated to a plurality try of production lines.

As described above, by performing step S12, the first allocating method can specify the top priority production line in which the mounting work can be completed earlier than other production line for each job group. By setting the top priority production line as a condition of an allocation target, the first allocating method can prevent the job group from being allocated only in one production line, and allocate the plurality of job groups between the plurality of production lines with excellent balance. Furthermore, by performing step S13, the first allocating method can specify the combination having the latest scheduled finish time among the combinations between the specified job group and the top priority production line. In step S14, the first allocating method can preferentially allocate the combination between the job group and the production line, which is specified in this manner. In FIG. 6, an aspect in which the plurality of job groups are allocated to the production line is illustrated. The hatched arrows illustrate job groups in which the allocation is completed before the allocating method is performed. The arrows not illustrated by hatching illustrate the job groups allocated by the above-described allocating method. As illustrated in FIG. 6, according to the above-described allocating method, since the job groups having late scheduled finish time, that is, long work time, are preferentially allocated to the top priority production line, as the allocating work proceeds, the job group having short work time remains. By using the job group which requires a short work time, it is possible to finely adjust the production finish time of the production line. For this reason, the above-described allocating method can uniformize the production finish time between the plurality of production lines.

(Second Allocating Method)

Figure 7:
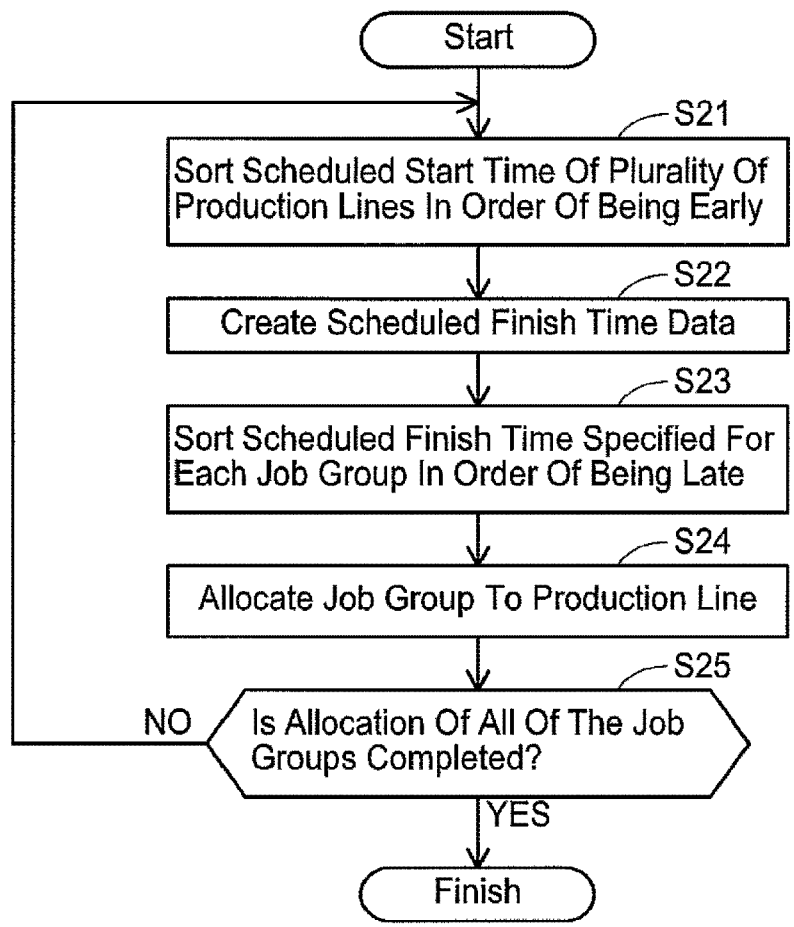
FIG. 7 illustrates a flowchart according to a second allocating method for creating the production order plan data.

Next, a second allocating method will be described. As illustrated in FIG. 7, in step S21, the processing device 21 of the managing device 20 sorts the scheduled finish time of the plurality of production lines in order of being early. Based on the result of sorting in order, the processing device 21 specifies the production line having the earliest scheduled start time among the plurality of production lines. Accordingly, the processing device 21 can specify the top priority production line, which is common to all of the job groups.

Figure 8:
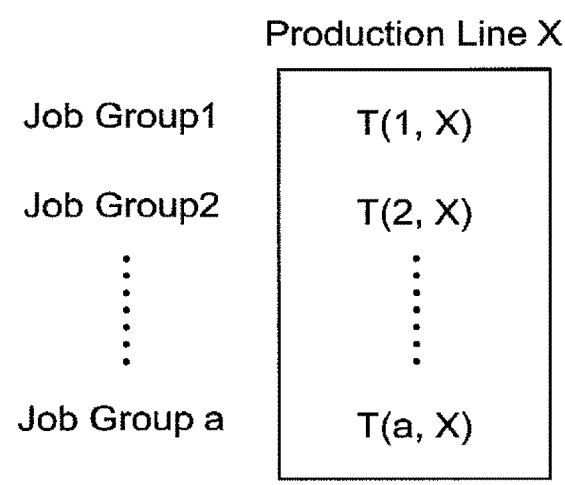
FIG. 8 illustrates a table showing scheduled finish time data created by a second allocating method.

Next, in step S22, the processing device 21 creates the scheduled finish time data 27 in the production line specified in step S21 by using the job group data 23, the production program data 24, the part data 25, and the production line performance data 26. In FIG. 8, a table, which shows the scheduled finish time data 27 is illustrated as an example. The scheduled finish time data 27 which is created by the second allocating method is data which describes the scheduled time at which the mounting work of the job group is finished with respect to the all of the combinations between the job groups and the specified production lines, when it is assumed that the job group is allocated to the production line (in this example, a production line X).

Next, in step S23, the processing device 21 sorts the scheduled finish time specified for each job group in an order of being late. Based on the result of sorting in order, the processing device 21 specifies the job group related to the latest scheduled finish time among the scheduled finish time specified for each job group and the production line thereof.

Next, in step S24, the processing device 21 allocates the job group specified in step S23 and the production line thereof, and describes the job group and the production line in the production order plan data 28. Accordingly, the processing device 21 can preferentially allocate the job group having a long work time to the top priority production line.

Next, in step S25, the managing device 20 determines whether or not the allocation of all of the job groups is completed. When the allocation of all of the job groups is completed, the allocating work is finished. When the allocation of all of the job groups is not completed, the process returns to step S21.

As described above, by performing step S21, the second allocating method can specify the top priority production line having the earliest scheduled start time. By setting the top priority production line as a condition of an allocation target, the second allocating method can prevent the job group from being allocated only in one production line, and allocate the plurality of job groups between the plurality of production lines with excellent balance. Furthermore, by performing steps S22 and S23, the second allocating method can specify the job group having the latest scheduled finish time in the specified top priority production line in step S24, the second allocating method can preferentially allocate, the combination between the job group and the production line, which is specified in this manner. According to the second allocating method, since the job groups having late scheduled finish time, that is, long work time, are preferentially allocated to the top priority production line, as the allocating work proceeds, the job group having short work time remains. By using the job group which requires a short work time, it is possible to finely adjust the production finish time of the production line. For this reason, the second allocating method can uniformize the production finish time between the plurality of production lines.

Technical elements described in the present description and the drawings show technical usability as being alone or in combination, and are not limited to the combination described in claims of the patent application. In addition, the technology illustrated as an example in the present description or the drawings achieves plural purposes at the same time, and has the technical usability by achieving any one of the purposes.

REFERENCE SIGNS LIST

1: ELECTRONIC COMPONENT MOUNTING SYSTEM
2: PRODUCTION LINE
3: HOST COMPUTER
12: INPUT DEVICE
14: DISPLAY DEVICE
20: MANAGING DEVICE
21: PROCESSING DEVICE
22: STORAGE DEVICE
23: JOB GROUP DATA
24: PRODUCTION PROGRAM DATA
25: PART DATA
26: PRODUCTION LINE PERFORMANCE DATA
27: SCHEDULED FINISH TIME DATA
28: PRODUCTION ORDER PLAN DATA
100: ALLOCATING DEVICE

The invention claimed is:

1. A managing method of an electronic component mounting system having a plurality of production lines, the method comprising:

calculating, by circuitry of a processing device coupled to a memory, scheduled finish times with respect to all combinations between unallocated job groups among a plurality of job groups and the plurality of production lines, the scheduled finish times being stored in the memory;

sorting, by the circuitry of the processing device, the calculated scheduled finish times for each of the plurality of production lines and for each of the unallocated job groups;

identifying, by the circuitry of the processing device, a top priority production line from the plurality of production lines based on the sorted scheduled finish times, the top priority production line having an earliest scheduled finish time;

allocating, by the circuitry of the processing device, one of the plurality of job groups related to a latest scheduled finish time among a table of earliest scheduled finish times sorted for the each of the unallocated job groups, to the top priority production line;

controlling, by the circuitry of the processing device, the top priority production line to transport a printed board and to mount at least one electronic component by at least one of a solder printing machine, a plurality of electronic component mounting machines, a board appearance inspection machine, and a reflow furnace corresponding to the one of the plurality of job groups on the printed board;

re-calculating and updating, by the circuitry of the processing device, the scheduled finish time of only the top priority production line by removing data regarding the allocated one of the plurality of job groups from the table of the earliest schedule finish times of the each of the unallocated job groups; and repeating the calculating, the sorting, the identifying, the allocating, the controlling, and the re-calculating until all of the plurality of job groups are allocated.

2. A managing device of an electronic component mounting system having a plurality of production lines, the device comprising:

circuitry coupled to a memory and configured to
calculate scheduled finish times with respect to all combinations between unallocated job groups among a plurality of job groups and the plurality of production lines, the scheduled finish times being stored in the memory;
sort the calculated scheduled finish times for each of the plurality of production lines and for each of the unallocated job groups;
identify a top priority production line from the plurality of production lines based on the sorted scheduled finish times, the top priority production line having an earliest scheduled finish time;

allocate one of the plurality of job groups related to a latest scheduled finish time among a table of earliest scheduled finish times sorted for the each of the unallocated job groups, to the top priority production line;

control the top priority production line to transport a printed board and to mount at least one electronic component by at least one of a solder printing machine, a plurality of electronic component mounting machines, a board appearance inspection machine, and a reflow furnace corresponding to the one of the plurality of job groups on the printed board;

re-calculate and update the scheduled finish time of only the top priority production line by removing data regarding the allocated one of the plurality of job groups from the table of the earliest schedule finish times of the each of the unallocated job groups; and repeat the calculating, sorting, identifying, allocating, controlling, and re-calculating until all of the plurality of job groups are allocated.

3. The managing device according to claim 2, wherein the memory further stores the table of the earliest schedule finish times of the each of the unallocated job groups.

4. The managing method according to claim 1, wherein the memory further stores the table of the earliest schedule finish times of the each of the unallocated job groups.

5. A managing method of an electronic component mounting system having a plurality of production lines, the method comprising:

sorting, by circuitry of a processing device coupled to a memory, scheduled start times for each of the plurality of production lines and for each of the unallocated job groups, the scheduled start times being stored in the memory;

calculating, by the circuitry of the processing device, scheduled finish times with respect to all combinations between unallocated job groups among a plurality of job groups and the plurality of production lines;

sorting, by the circuitry of the processing device, the calculated scheduled finish times for each of the plurality of production lines and for each of the unallocated job groups;

identifying, by the circuitry of the processing device, a top priority production line from the plurality of production lines based on the sorted scheduled start times, the top priority production line having an earliest scheduled start time;

allocating, by the circuitry of the processing device, one of the plurality of job groups related to a latest scheduled finish time among a table of earliest scheduled finish times sorted for the each of the unallocated job groups, to the top priority production line;

controlling, by the circuitry of the processing device, the top priority production line to transport a printed board and to mount at least one electronic component by at least one of a solder printing machine, a plurality of electronic component mounting machines, a board appearance inspection machine, and a reflow furnace corresponding to the one of the plurality of job groups on the printed board;

re-calculating and updating, by the circuitry of the processing device, the scheduled finish time and the scheduled start time of only the top priority production line by removing data regarding the allocated one of the plurality of job groups from the table of the earliest schedule finish times of the each of the unallocated job groups; and repeating the calculating, the sorting, the identifying, the allocating, the controlling, and the re-calculating until all of the plurality of job groups are allocated.

6. The managing method according to claim 5, wherein the memory further stores the table of the earliest schedule finish times of the each of the unallocated job groups.

* * * * *